Nov. 5, 1929.   A. M. NIVEN   1,734,395
SLEEVE VALVE ENGINE
Filed Dec. 12, 1927
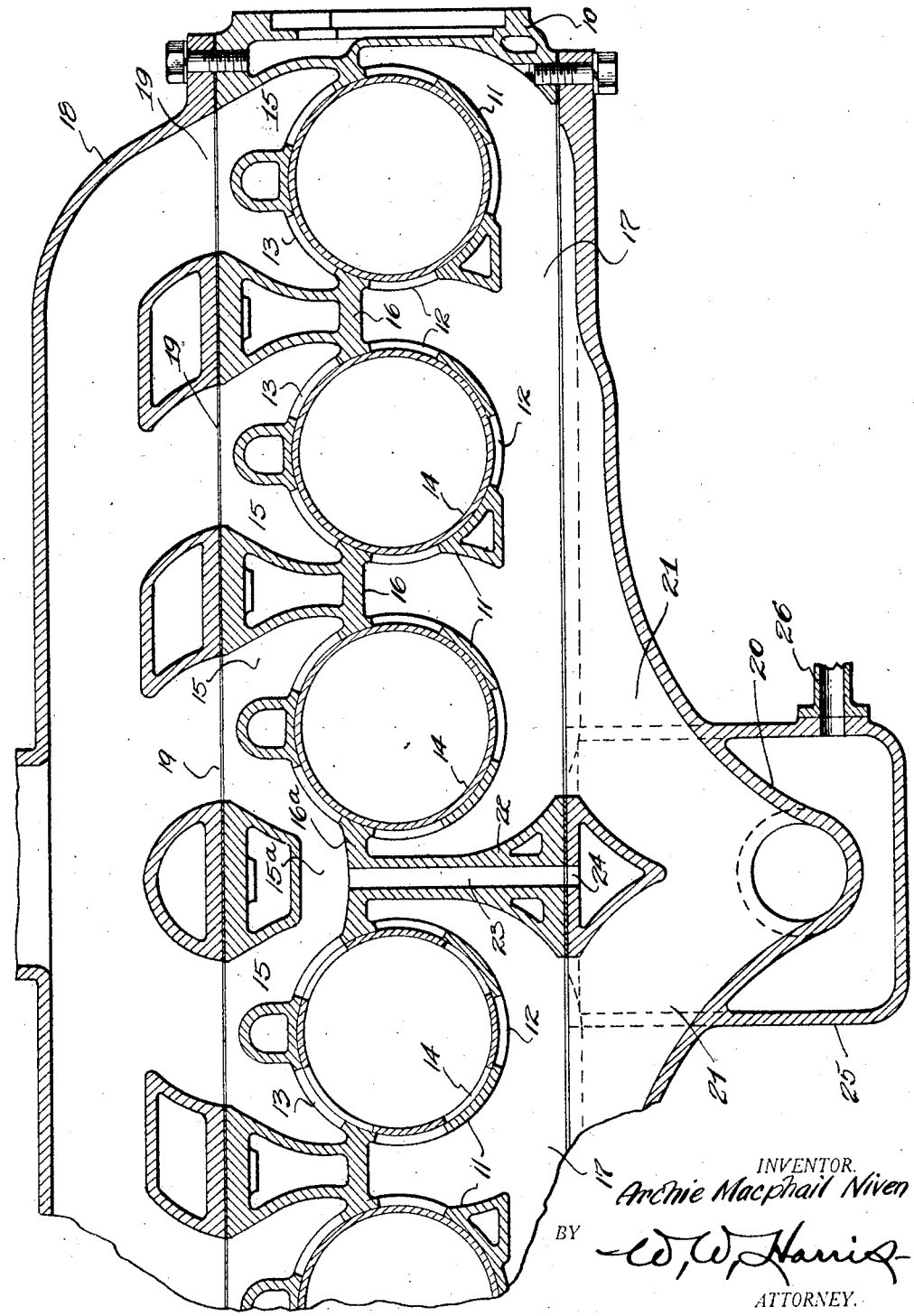
INVENTOR.
Archie Macphail Niven
BY
Ed. W. Harris
ATTORNEY.

Patented Nov. 5, 1929

1,734,395

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE-VALVE ENGINE

Application filed December 12, 1927. Serial No. 239,289.

This invention relates to internal combustion engines and more particularly to the sleeve valve and like types of engines. In this general type of engine it is customary and desirable to provide the fuel intake at one side of the engine and the exhaust at the other side. With such an arrangement difficulty is experienced in providing efficient, well appearing means capable of being made conveniently and cheaply, for heating the intake manifold or intake gases at one or more points by the exhaust gases.

My invention has among its objects the provision of means overcoming the aforesaid difficulties. I have provided a construction for use in sleeve valve or like engines which will efficiently heat the intake gases by utilizing a portion of the exhaust gases conducted from the exhaust chamber within the engine block to a jacket surrounding a portion of the intake manifold.

Further features of my invention reside in the novel combination and arrangement of parts as more particularly hereinafter described and claimed.

In the drawings, the single figure represents a plan sectional view of a multi-cylinder sleeve valve engine illustrating my invention.

Referring to the drawings reference character 10 represents the engine block or main cylinder casting having cylinders 11 which are provided with intake ports 12 and exhaust ports 13. One or more ported sleeve valves 14 control the cylinder ports as well known in the art.

The cylinder exhaust ports 13 communicate with the cylinder exhaust chambers 15, longitudinally extending walls 16 connecting adjacent cylinders and thereby separating the exhaust chambers 15 from generally similar cylinder intake chambers 17 communicating with the cylinder intake ports 12. An exhaust manifold 18 has branch conduits 19 respectively communicating with the cylinder exhaust chambers 15 and the intake manifold 20 on the opposite side of the engine has branches 21 conducting the fuel mixture to the intake chambers 17.

The engine cylinders may be divided by a transverse wall 22 connecting the central longitudinal wall $16^a$, a conduit 23 extending through walls $16^a$ and 22. The cylinders on opposite sides of wall 22 have their exhaust chambers 15 communicating through an auxiliary cylinder exhaust chamber $15^a$ which communicates with conduit 23. The conduit 23 has an outlet communicating at 24 with a heating jacket 25 surrounding a portion of the intake manifold 20, the jacket having a suitable outlet 26 conducting the exhaust gases from the jacket to any suitable point.

In operation during exhaust of the cylinders adjacent conduit 23, the exhaust gases of each cylinder pass through exhaust ports 13 to the chambers 15 and manifold 18 at the proper point in the general cycle of events for the engine. A portion of the exhaust gases passes to the auxiliary chamber $15^a$, through conduit 23 to the jacket 25 applying heat to the intake gases conducted through intake manifold 20. Any desired number of the engine cylinders may be arranged to supply auxiliary exhaust gas to apply heat to the intake manifold utilizing my invention.

The exhaust gases from the cylinder or cylinders supplying the heating jacket do not pass outside the cylinder block 10 in travelling from the cylinder exhaust ports 13 to the jacket inlet 24, thus providing efficient heating together with a relatively simple construction capable of ready and inexpensive manufacture. Furthermore, external piping is avoided, producing a pleasing appearance of the engine.

What I claim as my invention is:

1. A sleeve valve engine comprising in combination a cylinder block and a plurality of engine cylinders ported for intake and exhaust, sleeve valve means controlling said cylinder ports, cylinder intake and exhaust chambers respectively communicating with said cylinder intake and exhaust ports, intake and exhaust manifolds respectively on opposite sides of the engine and respectively communicating with the cylinder intake and exhaust chambers, and means communicating with said cylinder exhaust chamber within the cylinder block for conducting a portion of the exhaust gases to a point for applying heat to the intake gases.

2. A sleeve valve engine comprising in combination a cylinder block and a plurality of engine cylinders ported for intake and exhaust, sleeve valve means controlling said cylinder ports, cylinder intake and exhaust chambers respectively communicating with said cylinder intake and exhaust ports, intake and exhaust manifolds respectively on opposite sides of the engine and respectively communicating with the cylinder intake and exhaust chambers, a heating jacket for a portion of the intake manifold, and means communicating with said cylinder exhaust chamber within the cylinder block for conducting a portion of the exhaust gases to the jacket.

3. A sleeve valve engine comprising in combination, a cylinder block, a cylinder having intake and exhaust ports, sleeve valve means controlling said ports, intake and exhaust manifolds communicating with the intake and exhaust ports on opposite sides of the engine respectively, and means within the cylinder block conducting a portion of the exhust gases before delivery thereof to the exhaust manifold to a point for applying heat to the intake gases.

4. A sleeve valve engine comprising in combination, a cylinder block, a cylinder having intake and exhaust ports, sleeve valve means controlling said ports, intake and exhaust manifolds communicating with the intake and exhaust ports on opposite sides of the engine respectively, and means within the cylinder block conducting a portion of the exhaust gases before delivery thereof to the exhaust manifold in substantially the opposite direction from the normal travel of the exhaust gases to the exhaust manifold to a point for applying heat to the intake gases.

5. A sleeve valve engine comprising in combination, a cylinder block and a plurality of engine cylinders ported for intake and exhaust, sleeve valve means controlling said cylinder ports, cylinder intake and exhaust chambers respectively communicating with said cylinder intake and exhaust ports, intake and exhaust manifolds respectively on opposite sides of the engine and respectively communicating with the cylinder intake and exhaust chambers, a manifold heater jacket, walls extending longitudinally of the engine connecting adjacent cylinders and separating the cylinder intake and exhaust chambers, and a passageway extending transversely of said dividing walls communicating at one end with the exhaust chamber of one of said cylinders and communicating at the other end with said manifold heater jacket.

6. A sleeve valve engine comprising in combination a cylinder block and a plurality of engine cylinders ported for intake and exhaust, sleeve valve means controlling said cylinder ports, cylinder intake and exhaust chambers respectively communicating with said cylinder intake and exhaust ports, intake and exhaust manifolds respectively on opposite sides of the engine and respectively communicating with the cylinder intake and exhaust chambers, an auxiliary cylinder exhaust chamber connecting the exhaust chambers of a pair of cylinders, and means communicating with said auxiliary exhaust chamber for conducting a portion of the exhaust gases to a point for applying heat to the intake gases.

7. A sleeve valve engine comprising a combination a cylinder block and a plurality of engine cylinders ported for intake and exhaust, sleeve valve means controlling said cylinder ports, cylinder intake and exhaust chambers respectively communicating with said cylinder intake and exhaust ports, intake and exhaust manifolds respectively on opposite sides of the engine and respectively communicating with the cylinder intake and exhaust chambers, an auxiliary cylinder exhaust chamber connecting the exhaust chambers of a pair of cylinders, a manifold jacket, and a transversely extending cylinder block passageway communicating with the auxiliary chamber and manifold jacket.

8. A sleeve valve engine comprising in combination a cylinder block formed with a plurality of aligned cylinders, a plurality of walls extending longitudinally of the engine between adjacent cylinders, said cylinders being ported for intake and exhaust respectively on opposite sides of said walls, cylinder intake and exhaust chambers respectively communicating with the cylinder intake and exhaust ports on opposite sides of said walls, intake and exhaust manifolds respectively communicating with said intake and exhaust chambers and extending generally longitudinally of the engine on opposite sides thereof, a transverse wall separating adjacent cylinder intake chambers provided with a passageway receiving exhaust gases from one of said cylinder exhaust chambers, and an intake manifold heating jacket receiving the exhaust gases from said passageway.

9. A sleeve valve engine comprising in combination a cylinder block formed with a plurality of aligned cylinders, a plurality of walls extending longitudinally of the engine between adjacent cylinders, said cylinders being ported for intake and exhaust respectively on opposite sides of said walls, cylinder intake and exhaust chambers respectively communicating with the cylinder intake and exhaust ports on opposite sides of said walls, intake and exhaust manifolds respectively communicating with said intake and exhaust chambers and extending generally longitudinally of the engine on opposite sides thereof, a transverse wall separating adjacent cylinder intake chambers provided with a passageway receiving exhaust gases from the cylinder exhaust chambers of cylinders on opposite sides of said transverse wall, and an intake manifold heating jacket receiving the exhaust gases from said passageway.

10. A sleeve valve engine comprising in combination, a cylinder block having a plurality of cylinders, cylinder block intake and exhaust chambers, walls connecting adjacent cylinders, and a gas conducting conduit within the cylinder block extending through one of said walls for communication with one of said chambers.

11. A sleeve valve engine comprising in combination, a cylinder block having a plurality of cylinders, intake and exhaust manifolds, cylinder block intake and exhaust passages respectively communicating with said manifolds, an auxiliary exhaust chamber within the cylinder block, and a conduit within the cylinder block conducting auxiliary exhaust gases from said auxiliary exhaust chamber to a point suitable for applying heat to the intake manifold.

In witness whereof, I hereunto subscribe my name this 8th day of December, A. D. 1927.

ARCHIE MACPHAIL NIVEN.